United States Patent
Yamada

(10) Patent No.: US 7,761,203 B2
(45) Date of Patent: Jul. 20, 2010

(54) POWER CONSUMPTION RECORDING APPARATUS AND PROGRAM FOR THE SAME

(75) Inventor: Kazunao Yamada, Anjo (JP)

(73) Assignee: DENSO CORPORATION, Kariya (JP)

( * ) Notice: Subject to any disclaimer, the term of this patent is extended or adjusted under 35 U.S.C. 154(b) by 415 days.

(21) Appl. No.: 11/984,577

(22) Filed: Nov. 20, 2007

(65) Prior Publication Data

US 2008/0119982 A1  May 22, 2008

(30) Foreign Application Priority Data

Nov. 22, 2006 (JP) ............... 2006-315323

(51) Int. Cl.
*G01M 17/00* (2006.01)
(52) U.S. Cl. ............... 701/35; 701/22; 701/115; 701/210; 903/903; 290/40 B
(58) Field of Classification Search ............... 701/22, 701/35, 115, 210; 903/903, 906; 290/40 B, 290/40 C, 40 D
See application file for complete search history.

(56) References Cited

U.S. PATENT DOCUMENTS

| | | | | |
|---|---|---|---|---|
| 6,059,843 A | * | 5/2000 | Kirkhart | ............... 701/213 |
| 6,166,449 A | | 12/2000 | Takaoka et al. | |
| 6,282,495 B1 | * | 8/2001 | Kirkhart et al. | ............... 701/213 |
| 6,314,347 B1 | | 11/2001 | Kuroda et al. | |

FOREIGN PATENT DOCUMENTS

| | | |
|---|---|---|
| JP | A-6-197406 | 7/1994 |
| JP | A-2001-197608 | 7/2001 |
| JP | A-2003-70102 | 3/2003 |
| JP | A-2006-115623 | 4/2006 |

\* cited by examiner

*Primary Examiner*—Gertrude Arthur Jeanglaud
(74) *Attorney, Agent, or Firm*—Posz Law Group, PLC

(57) ABSTRACT

A power consumption recording apparatus is provided that can perform the following for multiple travels of a section traveled by the vehicle. The apparatus can detect as many power consumption events used by the vehicle as the multiple travels. When the vehicle has traveled a given section, the apparatus detects time attributes and occupant counts for the multiple travels. The apparatus divides the power consumption events detected for the section into groups based on power consumption magnitudes. For each group, the apparatus can record a representative power consumption of power consumption events belonging to the group, a time attribute and an occupant count corresponding to occurrence of the power consumption belonging to the group, and the number of occurrences of respective power consumption events, in association with each other.

16 Claims, 5 Drawing Sheets

| CATEGORY | JOULES | NUMBER OF TRAVELS | DATE | HOUR PERIOD | |
|---|---|---|---|---|---|
| BASIC POWER CONSUMPTION | 2500 | 1 | 1/21 | 8:00 | P RECORDS |
| | | | 3/8 | 9:00 | |
| | | | 4/9 | 9:00 | |
| | | | 4/11 | 22:00 | |
| | | | 4/13 | 20:00 | |
| | 2800 | 1 | 4/10 | 11:00 | |
| DRIVING-BASED POWER CONSUMPTION | 5000 | 1 | 1/21 | 8:00 | Q RECORDS |
| | | | 3/8 | 9:00 | |
| | | | 4/10 | 11:00 | |
| | | | 4/11 | 22:00 | |
| | | | 4/13 | 20:00 | |
| | 0 | 1 | 4/9 | 9:00 | |
| OPERATION-BASED POWER CONSUMPTION | 1250 | 1 | 1/21 | 8:00 | R RECORDS |
| | | | 4/11 | 22:00 | |
| | 500 | 1 | 3/8 | 9:00 | |
| | | | 4/9 | 9:00 | |
| | | | 4/10 | 11:00 | |
| | | | 4/13 | 20:00 | |

| CATEGORY | JOULES | NUMBER OF TRAVELS | DATE | HOUR PERIOD | |
|---|---|---|---|---|---|
| BASIC POWER CONSUMPTION | 2500 | 1 | 1/21 | 8:00 | ⎫ |
| | | 1 | 3/8 | 9:00 | ⎪ |
| | | 3 | ALL DAYS IN APRIL | 0:00 24:00 | ⎬ P RECORDS |
| | | 0 | UNUSED | UNUSED | ⎪ |
| | | 0 | UNUSED | UNUSED | ⎪ |
| | 2800 | 1 | 4/10 | 11:00 | ⎭ |

| CATEGORY | JOULES | SEASON | NUMBER OF TRAVELS | DATE | HOUR PERIOD | |
|---|---|---|---|---|---|---|
| BASIC POWER CONSUMPTION | 2500 | WINTER | 1 | 1/21 | 8:00 | P RECORDS |
| | | SPRING | 1 | 3/8 | 9:00 | |
| | | | 3 | ALL DAYS IN APRIL | 0:00 24:00 | |
| | | | 0 | ALL DAYS IN MAY | 0:00 24:00 | |
| | | AUTUMN | 0 | 9/13 | 9:00 | |
| | 2800 | SPRING | 1 | 4/10 | 11:00 | |

| CATEGORY | JOULES | SEASON | NUMBER OF TRAVELS | MONTH | DAY | HOUR PERIOD | |
|---|---|---|---|---|---|---|---|
| BASIC POWER CONSUMPTION | 2500 | | 1 | 3 | 1 | 0:00 | |
| | | | 1 | | | · | |
| | | | 2 | | | 24:00 | |
| | | | 1 | | 2 | | |
| | | | 0 | | · | | |
| | | | 1 | | 31 | | 365 × 24 |
| | | | 0 | 4 | · | | |
| | | | 1 | · | 31 | 24:00 | |
| | | | 2 | · | · | · | |
| | | | 3 | 2 | 28 | 24:00 | |
| | 2800 | | 1 | 9 | 15 | | |

US 7,761,203 B2

POWER CONSUMPTION RECORDING APPARATUS AND PROGRAM FOR THE SAME

CROSS REFERENCE TO RELATED APPLICATIONS

The present invention is based on and claims priority to unpublished Japanese Patent Application 2006-315323 filed on Nov. 22, 2006, the contents of which are incorporated herein by reference.

BACKGROUND OF THE INVENTION

1. Field of the Invention

The present invention relates generally to a power consumption recording apparatus and a program for the same, and more particularly to an apparatus and program for, inter alia, classifying power consumption events.

2. Description of Related Art

A technology of recording power consumption for a section traveled by a vehicle, such as a path section, route section, or the like and corresponding to at least a portion of a traveled route, path, or the like, has been proposed, for example, in JP-H6-197406 A. When a vehicle travels a given section more than once, the above-noted technology merely records a respective power consumption resulting from each travel on the section, independently of any other power consumption occasion, event, or the like, that may be sensed or detected.

SUMMARY OF THE INVENTION

The present invention is made in consideration of the foregoing. It is therefore an object of the invention to provide a technology to record multiple power consumption events in relationship to each other when the power consumption events result from a vehicle traveling a given section more than once.

To achieve the above-mentioned object, a power consumption recording apparatus according to the invention is mounted on a vehicle and includes a first detection function, a second detection function, and a recording function. Using the first detection function, the power consumption recording apparatus sequentially records power consumption events representing power used by the vehicle for corresponding travels in a given section. Using the second detection function, the power consumption recording apparatus sequentially detects at least one of the following quantities: time attributes associated with or otherwise corresponding to the travels made by the vehicle in the given section; and occupant counts of the travels associated with, or otherwise corresponding respectively to the time attributes.

The power consumption recording apparatus uses the recording function to divide the power consumption events detected by the first detection function into groups based on power consumption magnitudes. Further, the power consumption recording apparatus uses the recording function to record the following in association with each other for each of the groups: a representative power consumption representative of power consumption events belonging to a given group; and a time attribute or an occupant count corresponding to occurrence of a power consumption belonging to a given group.

The power consumption recording apparatus, according to various exemplary embodiments, records power consumption events for the same section in association with each other by relating the power consumption events resulting from travels in a given section to the representative power consumption.

A vehicle speed or a driving operation is not uniquely determined in a given section but may vary with conditions in the same section. A power consumption also varies with conditions in the same section. As mentioned above, the representative power consumption is recorded by classifying the power consumption events into groups based on power consumption magnitudes. Each recorded power consumption is recorded in association with a time attribute for occurrence of the power consumption in the corresponding group or an occupant count for the time attribute.

The representative power consumption is provided based on magnitudes of the detected power consumption events and is associated with the traveling time attribute and the occupant count for the group. Such recording can be used to estimate a power consumption corresponding to a future time attribute or an occupant count for the future time attribute with which the vehicle travels a given section.

The "time attribute" may be defined as a given point, a given range, a repetitive position, or a repetitive range on a temporal axis. Examples of the time attribute include but are not limited to parameters such as a time of day, a date, a day of week, a season, or the like, or any combination of parameters.

The recorded data such as the representative power consumption can be put to various uses. For example, the recorded data may be used to determine a charging schedule of a vehicle mounted with the power consumption recording apparatus. For vehicles equipped with an internal combustion engine, the power consumption recording apparatus may use the recorded data in association with an economical route retrieval operation that selects and guides a route to a destination with an optimum fuel economy. The power consumption recording apparatus may use the recorded data to display the recorded representative power consumption near a targeted section in the map. The recorded data can further be used based on the grouping and the association with the time attribute or occupant count as noted above.

In accordance with some exemplary embodiments, the power consumption recording apparatus may only record representative power consumption events and the other information. In such a case, the recorded information such as the representative power consumption may be later transferred to an information management center outside the vehicle, for example, by way of telecommunication or by transportation of a storage medium, or the like. The information management center may process the information for the above-mentioned uses.

The second detection function can detect as many time attributes as travels made by the vehicle in the given section. In such a case, the power consumption recording apparatus may use the recording function to record the following in association with each other for each of the groups: one of the representative power consumption events for a given group; multiple time attributes corresponding to occurrences of power consumption events belonging to a given group; and the number of occurrences of power consumption events belonging to a given group corresponding to one of the time attributes. Such recording can indicate how often a given representative power consumption occurs correspondingly to which time attribute.

In view of the above description, it should further be noted that the power consumption recording apparatus may use the recording function to collectively record part or all of the time attributes recorded for at least one of the groups into one time attribute based on satisfaction of a criterion condition.

The power consumption recording apparatus can relate, combine, associate or otherwise unify records of similar power consumption events that occurred for a similar time attribute such as the same month, the same hour period, and the same season. It is possible thereby to prevent the recording information accuracy from degrading and also to reduce the amount of recorded data.

When the vehicle has traveled the section more than once, the first detection function may detect the amount of power charged in the vehicle for the number of travels. In such a case, the power consumption recording apparatus may use the recording function to divide the detected charge amounts into groups based on charge amount magnitudes. For each of the groups, the power consumption recording apparatus may record the following items in association with each other: a representative charge amount of charge amounts belonging to the group; and time attributes corresponding to occurrences of charging with the charge amount belonging to the group and an occupant count corresponding to the time attributes.

The power consumption recording apparatus according to exemplary embodiments can relate, combine, associate or otherwise unify charge amounts from multiple travels on a given section into a representative charge amount. Charge amounts for the same section can be recorded in association with each other.

As will be understood, a vehicle speed or a driving operation is not uniquely determined in a given section in accordance, for example, with data recorded in the recording apparatus, but may vary with actual conditions in the same section. A charge amount also varies with conditions in the same section. As mentioned above, the representative charge amount is recorded by classifying the charge amounts into groups based on charge amount magnitudes. Each recorded charge amount is recorded in association with a time attribute of the occurrence of the charge amount in the corresponding group. An occupant count for the time attribute can further be associated.

Each group is provided with the representative charge amount determined according to the magnitudes of the detected charge amounts. The representative charge amount is associated with the traveling time attribute and the occupant count for the group. The recorded information can be used to estimate the charge amount corresponding to a future time attribute or an occupant count associated with a future time attribute for the section traveled by the vehicle.

When the vehicle travels multiple sections, the power consumption recording apparatus may record a representative power consumption in each of the sections. In such a case, the power consumption recording apparatus may perform the following in each of the sections traveled by the vehicle more than once: when the vehicle has traveled a given section, the first detection function is used to detect as many power consumption events used by the vehicle as the multiple travels; when the vehicle has traveled a given section, the second detection function is used to detect at least one of time attributes for the multiple travels and occupant counts for the multiple travels corresponding to the time attributes; and the recording function is used to classify the power consumption events detected by the first detection function in the section into groups based on power consumption magnitudes. It should be noted that the recording function is further used to record the following in association with each other in each of the groups: a power consumption representative of the power consumption events belonging to the groups; and a time attribute or an occupant count corresponding to occurrence of the power consumption belonging to the group.

The power consumption recording apparatus can further relate, combine, associate or otherwise unify power consumption events resulting from multiple travels in multiple sections into a representative power consumption. Power consumption events for the same section can be recorded for multiple sections in association with each other.

The power consumption recording apparatus may have a route specification function for specifying a scheduled traveling route for the vehicle. The power consumption recording apparatus may have a section power consumption estimation function that performs the following process for each of the sections contained in the scheduled traveling route. When the recording function records representative power consumption events for groups in a given section, the power consumption recording apparatus retrieves a representative power consumption whose associated time attribute or occupant count matches the current time attribute or occupant count. The power consumption recording apparatus specifies that power consumption as an estimated power consumption for the section. Further, the power consumption recording apparatus may specify the sum of estimated power consumption events for sections specified by the section power consumption estimation function as the estimated power consumption for the scheduled traveling route.

In such a manner, the power consumption recording apparatus can accurately estimate the power consumption for the scheduled traveling route using the representative power consumption events recorded for sections.

When the vehicle travels multiple sections to record the representative power consumption for each of the sections, the power consumption recording apparatus may be constructed to operate for each section as follows: when the vehicle has traveled a given section more than once, the first detection function detects as many consumptions used by the vehicle as the travels; when the vehicle has traveled a given section more than once, the first detection function detects as many charge amounts charged by the vehicle as the number of travels for the section; the second detection function detects as many time attributes as travels made by the vehicle in a given section or as many occupant counts as travels corresponding to the time attributes; the recording function divides the power consumption events detected by the first detection function for a given section into groups based on power consumption magnitudes and, for each of the groups, records, in association with each other, a representative power consumption of power consumption events belonging to the group and a time attribute and an occupant count corresponding to occurrence of the power consumption belonging to the group; and the recording means classifies the charge amounts detected by the first detection means for the section into groups based on charge amount magnitudes. In addition to the above noted operations, the recording means records a charge amount representative of the charge amounts belonging to each of the groups and a time attribute or an occupant count corresponding to occurrence of charging a charge amount belonging to the group in association with each other.

The power consumption recording apparatus can relate, combine, associate or otherwise unify power consumption events resulting from multiple travels in multiple sections into a representative power consumption. Power consumption events and charge amounts for the same section can be recorded for multiple sections in association with each other.

The power consumption recording apparatus may have a route specification function for specifying the vehicle's scheduled traveling route. The power consumption recording apparatus may have a section power consumption estimation function that performs the following process for each of the sections contained in the scheduled traveling route. When the recording function records representative power consumption events for groups in a given section, the power consumption recording apparatus retrieves a representative power consumption whose associated time attribute or occupant count matches the current time attribute or occupant count. The power consumption recording apparatus specifies that power consumption as an estimated power consumption for the section. Further, the power consumption recording apparatus may specify the sum of estimated power consumption events for sections specified by the section power consumption estimation function as the estimated power consumption for the scheduled traveling route.

The power consumption recording apparatus may perform the following process for each of the sections. When the recording function records representative charge amounts for the groups, the power consumption recording apparatus retrieves a representative charge amount whose associated time attribute or occupant count matches the current time attribute or occupant count. The power consumption recording apparatus specifies that charge amount as an estimated charge amount for the section.

Further, the power consumption recording apparatus can be provided with a charging schedule function. Based on the estimated charge amount for each of the specified sections, the power consumption recording apparatus determines sections to be enabled and those to be disabled from charging. The purpose is to be able to charge the power equivalent to the estimated total power consumption specified by a total power consumption estimation function through the scheduled traveling route.

In such a manner, the power consumption recording apparatus can accurately estimate the power consumption for the scheduled traveling route using the representative power consumption events and the representative charge amounts recorded for sections. Further, power consumption recording apparatus can provide a charging schedule for determining which section is to be enabled or disabled from charging.

It should be noted that in accordance with various embodiments, a program, such as a computer program or an article of manufacture containing instructions carried on a computer readable medium including a storage medium or a communication medium. The exemplary program can be used in a power consumption recording apparatus mounted on a vehicle and, when read by a computer, can cause the computer to function in accordance with the following description. The computer can function as a first detection means for sequentially detecting a plurality of power consumption events by the vehicle corresponding to a plurality of travels as a result of traveling a section by the vehicle more than once. The computer can further function as a second detection means for sequentially detecting at least one of a plurality of time attributes corresponding to the plurality of travels on the section by the vehicle and a plurality of occupant counts corresponding to the plurality of travels for the time attributes. Moreover, the computer can function as a recording means for classifying the plurality of power consumption events detected by the first detection means into a plurality of groups based on power consumption magnitudes and recording a representative power consumption representative of the plurality of power consumption events belonging to each of the plurality of groups and a time attribute or an occupant count corresponding to occurrence of a power consumption belonging to a given group in association with each other.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF THE EMBODIMENTS

Embodiments of the present invention will now be described in detail with reference to the accompanying drawings.

Figure 1:
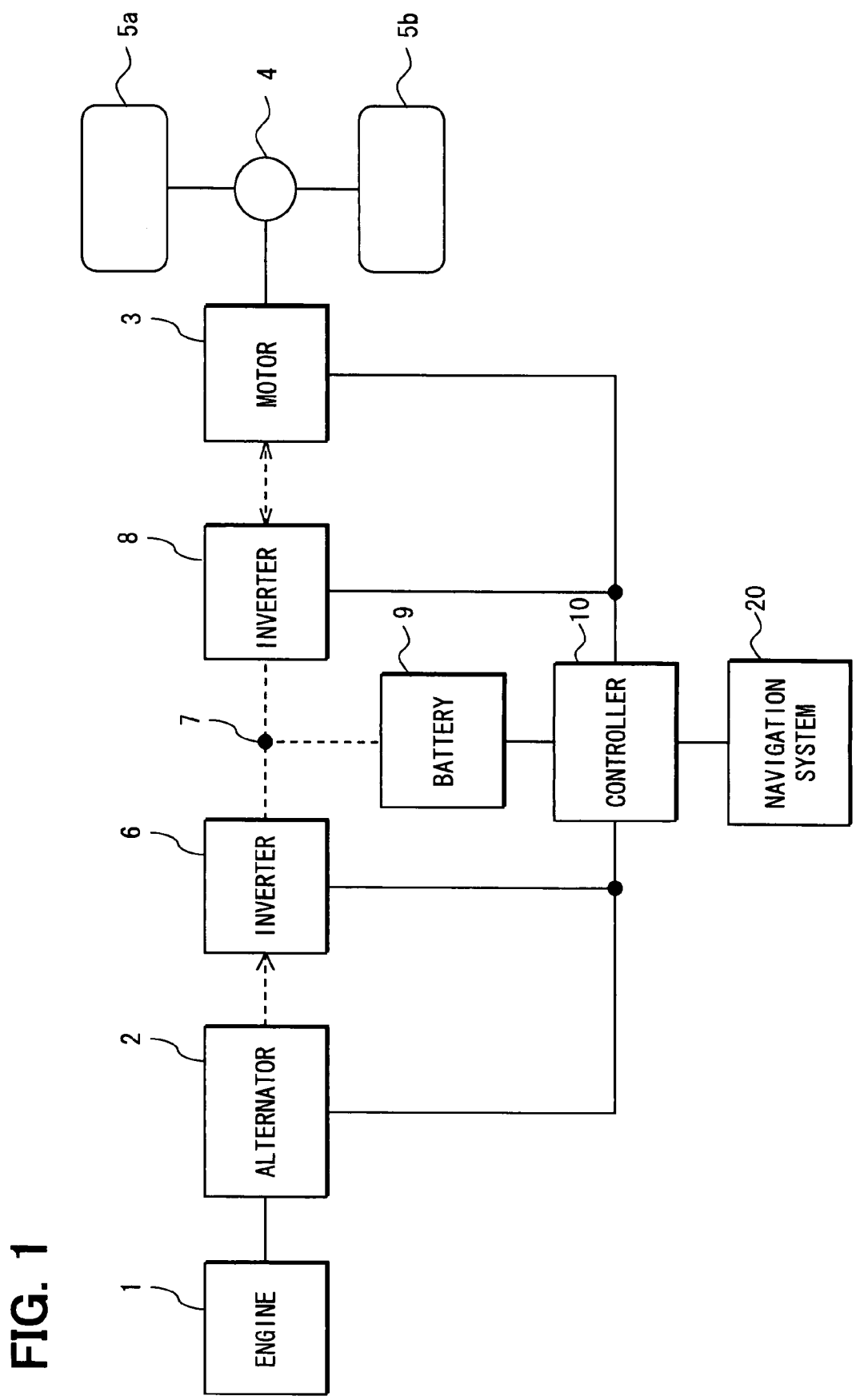
FIG. 1 is a block diagram illustrating an exemplary construction of a hybrid vehicle according to an embodiment.

As shown in FIG. 1, the construction of an exemplary hybrid vehicle according to an exemplary embodiment includes an engine 1, an alternator 2, a motor 3, differential gears 4, a tire 5a, a tire 5b, an inverter 6, a DC link 7, an inverter 8, a battery 9, a controller 10, and a navigation system 20.

As will be appreciated, the hybrid vehicle moves using the engine 1 and the motor 3 as power sources. When the engine 1 is used as a power source, a torque of the engine 1 is transmitted to the tires 5a and 5b through a clutch mechanism (not shown) and the differential gears 4. When the motor is used as a power source, a direct-current power of the battery 9 is converted into an alternating-current power through the DC link 7 and the inverter 8. The alternating-current power operates the motor 3. A torque of the motor 3 is transmitted to the tires 5a and 5b through the differential gears 4.

The torque of the engine 1 is also transmitted to the alternator 2. The torqued alternator 2 generates an alternating-current power. The generated alternating-current power is converted into a direct-current power through the inverter 6 and the DC link 7. The direct-current power is used to charge the battery 9. To start the engine 1, the alternator 2 operates on power from the battery 9 as a power source. The torque of the alternator 2 rotates and starts the engine 1.

When a brake mechanism (not shown) decelerates the hybrid vehicle, the decelerating resistance is applied as a torque to the motor 3. The torque causes the motor 3 to generate an alternating-current power that is converted into a direct-current power through the inverter 8 and the DC link 7. The direct-current power is used to charge the battery 9.

Based on instructions from the navigation system 20, the controller 10 controls whether or not to perform the above-mentioned operations on the alternator 2, the motor 3, the inverters 6 and 8, and the battery 9. The controller 10 may be embodied, for example, as a microcomputer.

The navigation system 20 sequentially records a history of the traveling hybrid vehicle including information such as a power consumption, a charge amount, a drivers operation, an occupant count, a traveling time attribute, and a traveling section. Based on the recorded history, the navigation system 20 specifies an optimum route to the destination and creates a charging schedule for each section on the specified optimum route. Based on the created charging schedule, the navigation system 20 issues an instruction to the controller 10. The instruction enables or disables the alternator 2 from charging the battery 9 depending on sections.

Figure 2:
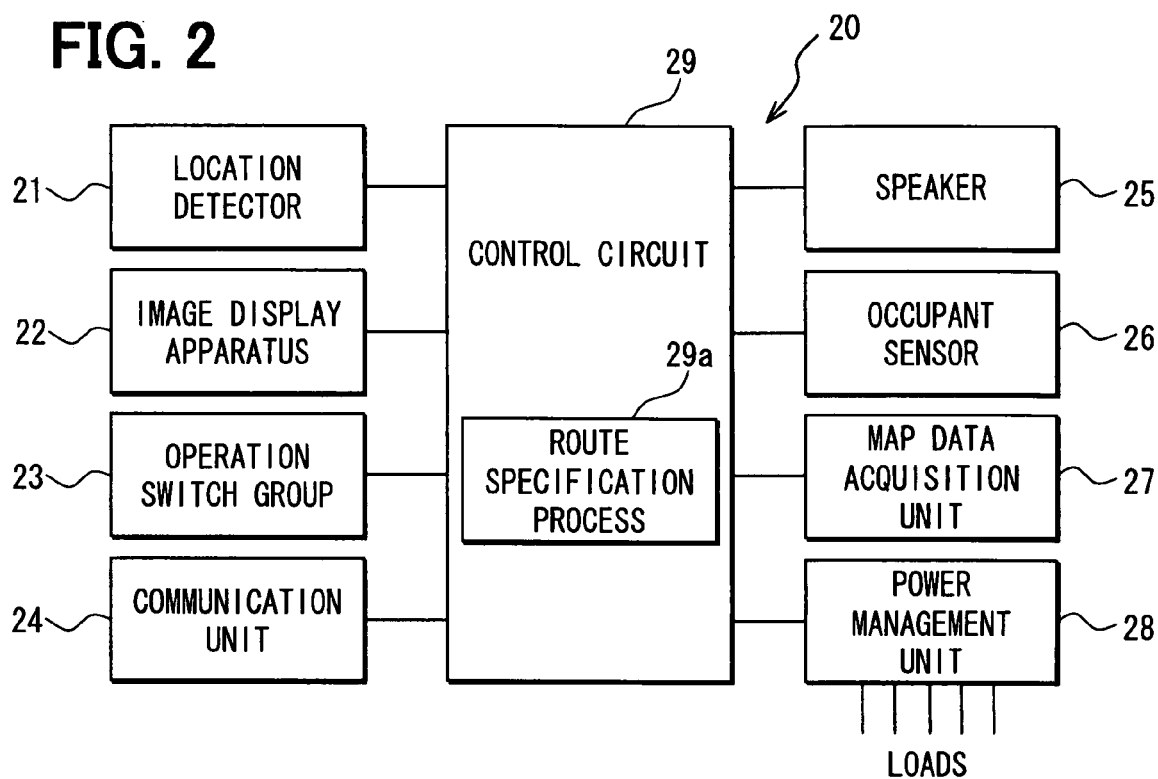
FIG. 2 is a block diagram illustrating a hardware construction of an exemplary navigation system.

As can be seen in FIG. 2, the navigation system 20 includes a location detector 21, an image display apparatus 22, an operation switch group 23, a communication unit 24, a speaker 25, an occupant sensor 26, a map data acquisition unit 27, a power management unit 28, and a control circuit 29.

The location detector 21 includes sensors (not shown) such as a geomagnetic sensor, a gyroscope, a vehicle speed sensor, and a GPS receiver. The location detector 21 acquires information for specifying the vehicle's current location, orientation, and speed based on characteristics of the sensors and outputs the information to the control circuit 29. The image display apparatus 22 provides a video display based on a video signal output from the control circuit 29 viewable, for example, by a user. The operation switch group 23 generates signals based on user activity, for example, from input devices such as a mechanical switch and a touch panel and outputs the signals to the control circuit 29.

The communication unit 24 can be embodied as a radio communication apparatus for communication with an information management server (not shown). The information management server is provided outside the hybrid vehicle such as on a road or in a building. The information management server receives data from the navigation system 20 via the communication unit 24 and stores the data. When a request for data is made, for example, by the navigation system 20 via the communication unit 24, the information management server can extract the requested data from the stored data and transmit the extracted data to the navigation system 20. The radio communication using the communication unit 24 between the navigation system 20 and the information management server may be conducted directly, for example, without using a repeater. Alternatively, the radio communication may be conducted using, for example, a radio base station or a repeater on a wired or wireless wide-area communication network.

The occupant sensor 26 detects the number of occupants in the hybrid vehicle and outputs the number of detected occupants to the control circuit 29. For example, the occupant sensor 26 may include multiple weight sensors provided for seats in the hybrid vehicle. The occupant sensor 26 may detect the number of occupants based on signals from the weight sensors. Alternatively, the occupant sensor 26 may include a camera for capturing an interior of the hybrid vehicle. The occupant sensor 26 may apply a known image analysis procedure such as a pattern recognition procedure to a captured image generated from the camera, identify the number of persons in the captured image, and assign the detected number of persons as the number of occupants.

The map data acquisition unit 27 can include nonvolatile storage media such as DVD, CD, and HDD, and an apparatus for reading or writing data on the storage media. The storage medium can store, for example, a program executed by the control circuit 29 and map data for route guidance.

The map data contains road data and facility data. The road data contains link location information and type information, node location information and type information, and information about any relationship between a node and a link. The facility data contains names of facilities such as restaurants, convenience stores, and parking areas, and their locations.

The power management unit 28 monitors power consumption and charging in the hybrid vehicle. Specifically, the power management unit 28 continuously monitors the total amount of electric power such as the power consumption, supplied from the battery 9 and correspondingly delivered to load sources in the hybrid vehicle. In addition, the power management unit 28 continuously monitors whether the load sources are active or inactive. For example, the load sources include the alternator 2, the motor 3, an engine ECU for controlling operations of the engine 1, a throttle ECU for controlling operations of an electronic throttle, a stabilizer ECU for controlling a vehicle stabilizing system, a meter, an antilock brake system, a power steering system, a power window system, the navigation system 20, an audio system, an air conditioning system, a wiper, and an interior light. Of the load sources, a user can turn on or off, for example, the power window system, the navigation system 20, the audio system, the air conditioning system, the wiper, and the interior light. The power management unit 28 continuously monitors operation on these load sources, for example, by the user.

The total amount of electric power, that it, the power consumption supplied to the load sources is preferably monitored, for example, by detecting the amount of current applied to the load sources. A signal from a load source may be used to specify activation or inactivation of the load source and the contents of operation on the load source.

The power management unit 28 continuously detects the amount of electricity supplied to the battery 9 from the alternator 2 and the motor 3. It may be preferable to monitor the amount of electricity supplied from the alternator 2 and the motor 3, such as the charge amount, by detecting the amount of current from the alternator 2 and the motor 3. The power management unit 28 may continuously monitor the state of charge (SOC) of the battery to monitor the power consumption and the charge amount based on a change in the SOC.

The control circuit 29 can be embodied, for example, as a microcomputer and includes a CPU, RAM, ROM, a nonvolatile storage medium, and data I/O. The nonvolatile storage medium includes flash memory, EEPROM, and backup RAM and can record data even when the vehicle main power supply is off. Thus, when recording is described herein, reference is being made to the transfer and fixation of data therein by, for example, the control circuit 29 to a storage medium or I/O device for external storage. Since recording is a well known operation in the art, it will be appreciated that all of the possible manners of recording are not exhaustively described. The CPU reads a program for operations of the vehicle navigation system 1 from the RAM or the map data acquisition unit 27 and executes the program. When executing the program, the CPU reads information from the RAM, the ROM, and the map data acquisition unit 27 and writes the information to the RAM and, where possible, the storage medium of the map data acquisition unit 27. The CPU exchanges signals with the location detector 21, the image display apparatus 22, the operation switch group 23, the communication unit 24, the speaker 25, the occupant sensor 26, and the power management unit 28.

The control circuit 29 executes the program to implement a map matching process, a route specification process 29a, a route guidance process, a travel history recording process, and a charging schedule process.

The map matching process specifies a road where the vehicle is running, and the vehicle's location on the road based on a signal from the location detector 21 and map data in the map data acquisition unit 27.

The route specification process 29a calculates an optimum guiding route from the current location to a destination using map data according to a shortest path solution such as can be found, for example, using the Dijkstra algorithm. Data may be entered to specify the destination.

The route guidance process reads the map data from the map data acquisition unit 27. The process overlays an image containing the calculated guiding route, destination, pass-through points, and current location on a map indicated by the map data and outputs the image to the image display apparatus 22. When the vehicle approaches a guided intersection, for example, the route guidance process allows the speaker 22 to generate a speech guidance signal that instructs a driver to turn to the right or left according to need.

Figure 3:
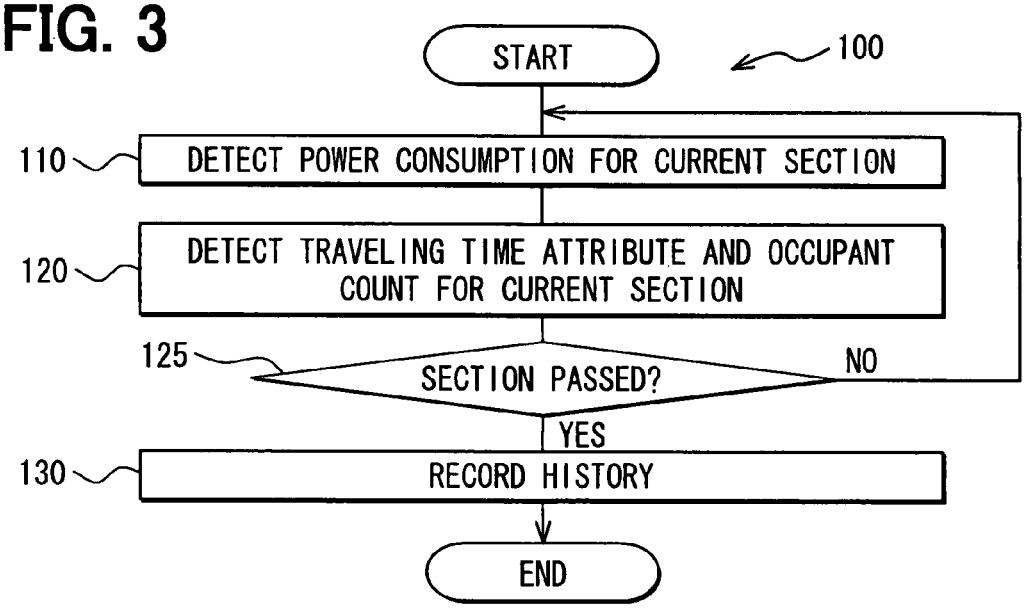
FIG. 3 is a flowchart illustrating portions of an exemplary program.

The travel history recording process records a travel history of each section traveled by the vehicle in the nonvolatile storage medium of the control circuit 29 or the storage medium of the map data acquisition unit 27. The travel history contains the power consumption, charge amount, vehicle driving operations, vehicle speed changes, brake control, traveling time attribute, and occupant count. The control circuit 29 repeatedly executes a program 100 corresponding, for example, to exemplary routines or the like as shown in FIG. 3, to perform the travel history recording process.

By repeatedly executing the program 100, the control circuit 29 repeatedly detects the power consumption for a section, for example, at 110, where the vehicle enters and exits. In addition, the control circuit 29 repeatedly detects the section's traveling time attribute and the occupant count for the traveled section at 120. When the vehicle is finished passing through the section: YES at 125, the control circuit 29 classifies the detected travel history into sections for recording at 130. The control circuit 29 detects information other than the power consumption, traveling time attribute, and occupant count in the travel history along with the power consumption at 110. One section is assumed to be one link in the map data.

Figure 4:
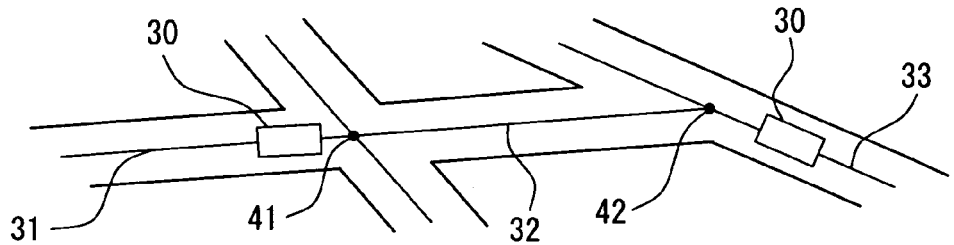
FIG. 4 is a diagram illustrating exemplary travel of a vehicle.
Figures 5, 6:
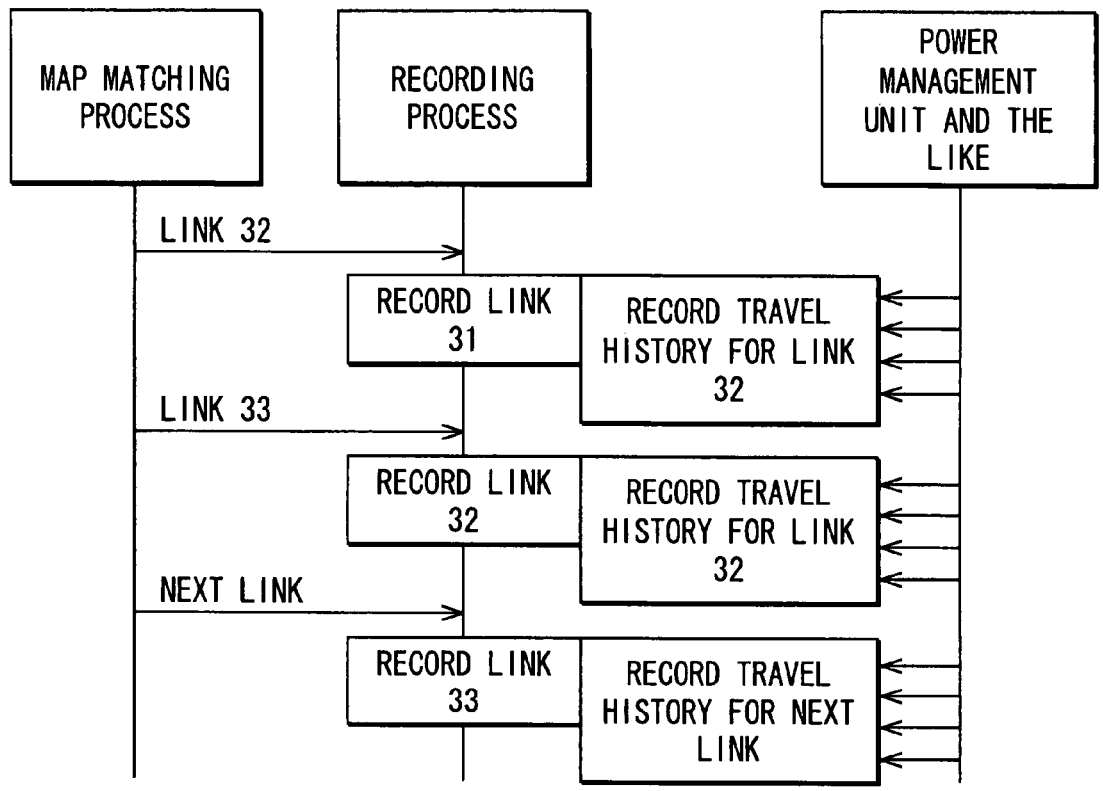
FIG. 5 is a timing diagram illustrating exemplary timing associated with detecting and recording a travel history.
FIG. 6 is a diagram illustrating an exemplary format for recording the power consumption.

As shown in FIG. 4, for example, let us suppose that the vehicle 30 is a hybrid vehicle mounted with the system described herein. Vehicle 30 travels through links 31, 32, and 33 in the noted order. While the vehicle travels the link 31, the exemplary system uses the power management unit 28 to detect information such as power consumption, time attributes, number of occupants, and the like, that will be used to construct the travel history of the link 31. When the vehicle passes through a node 41 and enters the link 32, the system collectively records the up to date detected travel history associated with the link 31 according to a classification method to be described in greater detail hereinafter. Upon entry into link 32, the system begins detecting the travel history associated with the link 32 as shown in FIG. 5. When the vehicle 30 passes through a node 42 and enters the link 33, the system collectively records the up to date detected travel history associated with the link 32 according to a classification method to be described later and starts detecting the travel history about the link 33 as shown in FIG. 5.

With reference back to FIG. 2 and FIG. 3, whether or not the vehicle passes through a given section can be determined at 125 by determining whether or not a result of the map matching process shows entry of the vehicle into a new node. At 130, the system records the travel history assuming that the up to date detected travel history is related to a link specified by the map matching process immediately before the vehicle is detected to enter a new node. The travel history to be recorded is related, associated with, or the like, to a link specified by the map matching process after the vehicle has traveled the link for a sufficient time. The travel history can be accurately related, associated with, or the like, to the traveling section while the travel history is recorded on a section basis because the map matching accuracy increases as the vehicle travels the link after passing through the node.

The following describes a more specific method of detecting and recording the power consumption in connection with the exemplary travel history described above. At 110, the control circuit 29 detects the power consumption in the vehicle in three categories. The three categories of power consumption include: basic power consumption; driving-based power consumption; and operation-based power consumption.

The basic power consumption is used, for example, for running of the vehicle. The power consumption per unit time is not substantially affected by the basic power consumption that is associated with the basic operation for driving the vehicle. For example, the basic power consumption can include the engine ECU, the throttle ECU, the stabilizer, ECU, and the meter described above.

The driving-based power consumption per unit time varies with the operation during driving the vehicle. For example, the driving-based power consumption concerns the consumption associated with the antilock brake system and the power steering system. The power consumption per unit time for these systems greatly varies between high speed driving and or cornering as compared to a driving or steering operation in a parking area or a garage.

The operation-based power consumption varies when, for example, a device is manually turned on or off. For instance, the operation-based power consumption concerns the power window system, the navigation system 20, the audio system, the air conditioning system, the wiper, and the interior light.

The control circuit 29 can read load source category data from the ROM, the nonvolatile storage medium, and the storage medium for the map data acquisition unit 27. The load source category data indicates to which of the above-mentioned categories the load source in the vehicle belongs.

When detecting an increase in the total power consumption per unit time at 110, the control circuit 29 specifies which load source in the vehicle causes the total power consumption to increase. The control circuit 29 specifies to which of the categories the power consumption of the specified load source belongs. Which load source increases the total power consumption is determined as follows. When the power management unit 28 detects a load source that is activated in response to the increase, the load source is assumed to be the cause of the increase. When the power management unit 28 detects a load source that is manually activated by the driver in response to the increase, the load source is assumed to be the cause of the increase.

When detecting a decrease in the total power consumption at 110, the control circuit 29 specifies which load source in the vehicle causes the total power consumption to decrease. The control circuit 29 specifies to which of the categories the power consumption of the specified load source belongs. The identification of which load source decreases the total power consumption is determined as follows. When the power management unit 28 detects a load source that is deactivated in response to the decrease, the load source is assumed to be the cause of the decrease. When the power management unit 28 detects a load source that is manually deactivated by the driver in response to the decrease, the load source is assumed to be the cause of the decrease.

When the total power consumption increases or decreases, the control circuit 29 can determine to which of the categories the increased or decreased power consumption belongs. After the vehicle has traveled one section, the control circuit 29 can specify at 130 the power consumption corresponding to each of the categories noted above, for the entire section. The control circuit 29 records the basic power consumption, the driving-based power consumption, and the operation-based power consumption for the specified section along with the time attribute and the occupant count for the most recently traveled section in the nonvolatile storage medium of the control circuit or the storage medium of the map data acquisition unit 27.

The time attribute for the most recently traveled section uses a representative value for running times detected at 120 while the vehicle was traveling the section. The representative value may be, for example, an average value, a first value, or a last value. The occupant count for the most recently traveled section uses the occupant count detected at 120 while the vehicle was traveling the section.

Figures 7, 8:
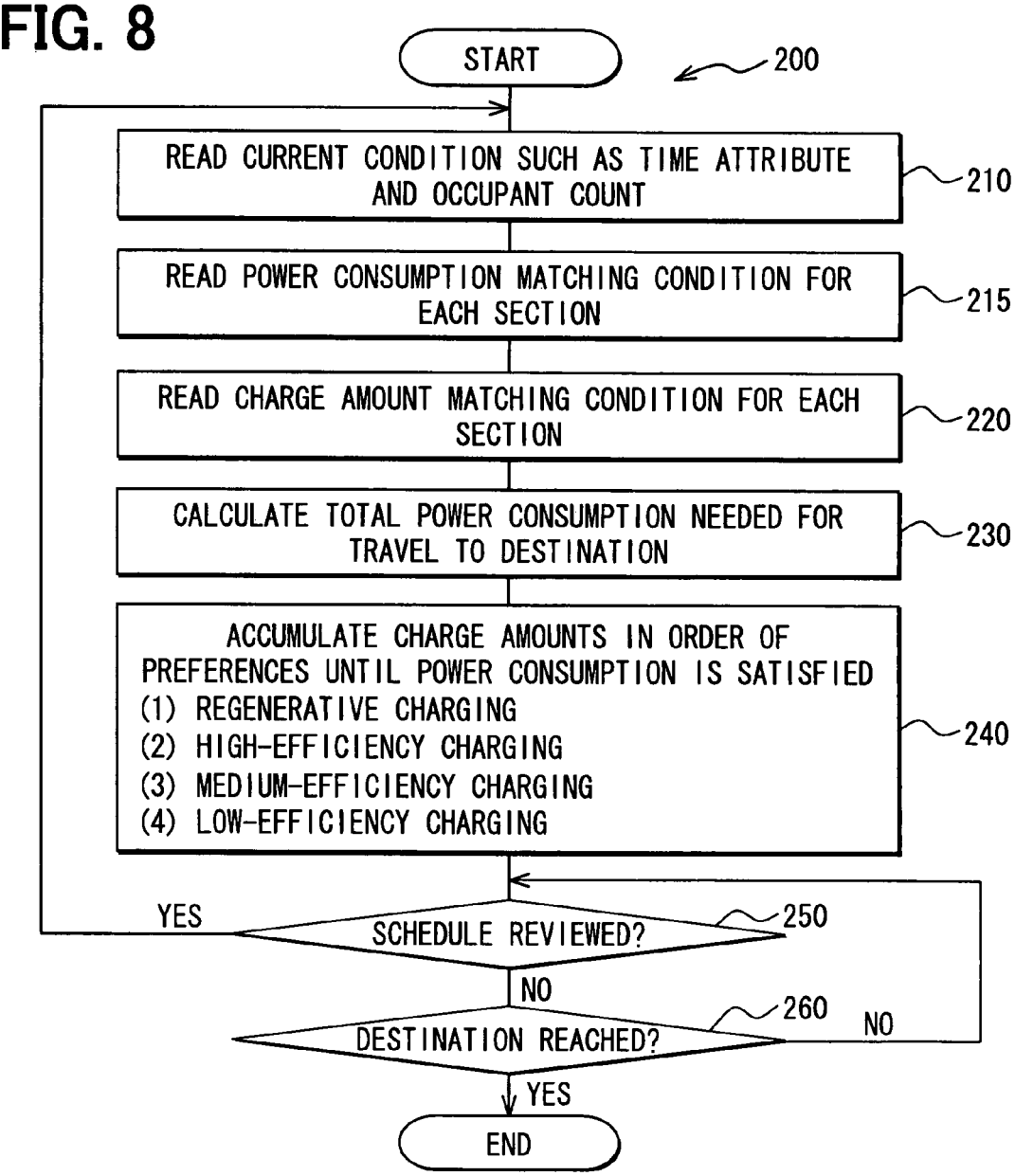
FIG. 7 is a diagram further illustrating an exemplary format for recording the power consumption.
FIG. 8 is a flowchart illustrating portions of a program for an exemplary charging schedule process.

FIG. 6 and FIG. 7 show examples of recording the power consumption such as is conducted during procedure 130 of the flowchart in FIG. 3, in units of joules. The power consumption data is recorded as one table corresponding to a combination of the section and the occupant count. In FIG. 6, one table is divided into three sub-tables corresponding to the power consumption categories. The sub-tables for the basic, driving-based, and operation-based power consumption events contain a number of records shown, for example, as P, Q, and R. The user may define values for P, Q, and R. Even though the vehicle travels the same section, a change in any of the three categories may cause a large variation in the power consumption. It should be noted that the category experiencing a change may contain a large number of records in the sub-table. A large number of data areas are allocated to sub-tables where the power consumption variation is large. A small number of data areas are allocated to sub-tables where the power consumption variation is small. Specifically, P is smaller than Q or R. In such a manner, the data areas can be used efficiently.

Again, as shown in FIG. 6, one record in the sub-table for a given category can contain four fields: a power consumption field shown in joules and corresponding to the category for one or more travels along the section based on the occupant count; a travel count; a traveling date, which is similar to the exemplary time attribute value previously described; and a traveling hour period or a range of hour, which is also similar to the exemplary time attribute value previously described. A power consumption's field value is represented approximately by discrete quantities in increments of 100 joules according to the present example such as 100, 200, 300, and so on. For example, detected power consumption events of 2560 joules and 2501 joules would both be recorded as 2500 joules. It should be noted that the discrete quantity is hereafter referred to as a discrete value and is similar to a representative power consumption example described herein.

At 130, in FIG. 3, the control circuit 29 applies detected quantities including the power consumption in the appropriate category to each sub-table in the table based on a combination of factors such as the occupant count and the most recently traveled section. Specifically, let us suppose that the sub-table already contains a record for the section indicating the same category of power consumption, date of the travel along the section, and hour period for the traveled section. The control circuit 29 increments the travel count of the record by one. If the sub-table does not contain a record in which the above described fields match, the control circuit 29 can allow one of the unused records, such as a record that does not contain meaningful data to be updated to contain the newly acquired discrete value for the power consumption. The travel count would then be updated indicating a value of one, the date of traveling the section, and the hour period for the traveled section.

It should be noted that no unused records may remain in a sub-table for the combination of the occupant count and the section. That is, a sub-table may reach the maximum number of records containing meaningful data. At 130 of FIG. 3, the control circuit 29 fine-tunes such sub-table.

Let us suppose, as in an exemplary group example, that the sub-table contains multiple records assigned with similar time attributes in a record group of the same discrete value for the power consumption. The control circuit 29 combines these records into one record. For example, the similar time attribute is identified by completely the same date but only a different hour period; or only the same month in the date.

In the case where the records share the same date but only a different hour period, the control circuit 29 makes a new record out of the similar records and empties the records that were combined into the new record. In the new record, the discrete value for the power consumption equals that for the similar records. The travel count becomes a sum of the travel counts for the similar records. The date equals that for the similar records. The hour period covers the hour periods for the similar records.

For example, let us suppose that the hour periods for the records begin at eight a.m. and ten a.m. and have a time difference that is smaller than a specified value. The control circuit 29 can provide the new record with an hour period ranging from eight a.m. to ten a.m. As another example, let us suppose that the hour periods for the records begin at eight a.m. and eight p.m. and a time difference exceeds a specified value. The control circuit 29 provides the new record with an all-day hour period ranging from twelve a.m. to eleven p.m.

In the case where only the same month in the date is shared, the control circuit 29 makes a new record out of the similar records and empties the records that were combined into the new record. In the new record, the discrete value for the power consumption equals that for the similar records. The travel count becomes a sum of the travel counts for the similar records. The date indicates only the month for the similar records. The hour period takes effect all day.

For example, the sub-table for the basic power consumption in FIG. 6 changes to that as shown in FIG. 7. The sub-table in FIG. 6 contains three records having the same discrete value for the basic power consumption and the same traveling month. These records are unified into one new record as shown in FIG. 7. In the record, the date field indicates April from the beginning to the end. The hour period field indicates 00:00 through 24:00, i.e., all day long.

Each time the sub-table satisfies a condition, such as a criterion condition, of lacking an unused record, records are unified into one based on the same time attribute to generate a new unused record.

The control circuit 29 can unify records about similar power consumption events assigned with similar time attributes. It is possible to prevent the recording information accuracy from degrading and reduce the amount of recorded data.

When the vehicle travels multiple sections by repeatedly executing the program 100, the control circuit 29 records a discrete value for the power consumption corresponding to each of the sections. The control circuit 29 performs the following in each of the sections traveled by the vehicle more than once: when the vehicle has traveled a given section, the control circuit 29 categorizes as many power consumption events used by the vehicle as the multiple travels according to the consumption modes and detects them, such as described in FIG. 3 with regard to 110; when the vehicle has traveled a given section, the control circuit 29 detects time attributes for the multiple travels and occupant counts for the multiple travels corresponding to the time attributes such as described in FIG. 3 with regard to 120; the control circuit 29 can divide the power consumption events detected for the section into groups based on power consumption magnitudes such as described in FIG. 3 with regard to 130; for each of the groups, the control circuit 29 records the following in association with each other: a representative power consumption of power consumption events belonging to the group in terms of a discrete value; a time attribute and an occupant count belonging to the group and corresponding to the power consumption event; and the number of occurrences of the power consumption event for each of the time attributes in association with the group.

The navigation system 20 combines, unifies or the like, power consumption events resulting from multiple travels in multiple sections into a representative power consumption. Power consumption events for the same section can be recorded for multiple sections in association with each other. Such recording makes it clear how often a given representative power consumption occurs for which time attribute.

The navigation system 20 classifies power consumption events into three categories, i.e., the basic power consumption, the driving-based power consumption, and the operation-based power consumption and manages data based on similar time attributes according to the categories independent of each other. The basic power consumption does not generally varies for the same section. It should be noted that the driving-based and operation-based power consumption events greatly vary with travel conditions even for the same section. Let us suppose that the three power consumption events are collectively recorded as a total power consumption. A variation in the driving-based or operation-based power consumption would causes a rate of change for the total power consumption to be smaller than a rate of change for the driving-based or operation-based power consumption. Therefore, it is necessary to provide a small ratio between a range of discrete values for the power consumption and the power consumption magnitude.

The three categories of power consumption events may feature different typical magnitudes. For example, the basic power consumption is based on several hundreds watts. The driving-based power consumption is based on several thousands watts. The operation-based power consumption is based on several watts. When the three categories of power consumption events are collectively recorded as a total power consumption, a noise due to a change in the driving-based power consumption makes unclear a change in the operation-based power consumption.

By contrast, the invention classifies power consumption events into three categories, such as the basic power consumption, the driving-based power consumption, and the operation-based power consumption. The invention manages data according to similar time attributes independently of each other. It is possible to clearly detect the power consumption for each category and provide a relatively large ratio between a range of discrete values for the power consumption and the power consumption magnitude.

In a manner similar to the above described power consumption example, recording the charge amount also uses a table for each combination of the traveling section and the occupant count. The nonvolatile storage medium of the control circuit 29 or the map data acquisition unit 27 stores the table. It will be appreciated that the table contains: a sub-table of charge amount based on high-efficiency charging by the alternator 2; a sub-table of charge amount based on medium-efficiency charging by the alternator 2; a sub-table of charge amount based on low-efficiency charging by the alternator 2; and a sub-table of regenerative charge amount generated by the motor 3.

At 110 of the program 100, the control circuit 29 uses the power management unit 28 to detect the following for the current section: the charge amount based on high-efficiency charging by the alternator 2; the charge amount based on medium-efficiency charging by the alternator 2; the charge amount based on low-efficiency charging by the alternator 2; and the regenerative charge amount generated by the motor 3. A known method can be used to determine whether the alternator 2 provides high-efficiency, medium-efficiency, or low-efficiency charging. The method uses a ratio between an injection quantity needed for the power generation and a generated output from the alternator 2. The injection quantity is acquired from the throttle ECU via the power management unit 28.

At 130, the control circuit 29 stores a record in the sub-table for each charge amount. The record contains a discrete value for the charge amount in a manner similar to the above noted example, a travel count for the section, a traveling date for the section, and a traveling hour period. When the sub-table satisfies the condition of lacking an unused record in a specified number of predetermined records, existing records are unified into one based on similar time attributes. In such a case, the sub-table is not generated by dividing the physical quantities into categories such as the sub-tables for the basic, driving-based, and operation-based power consumption events as mentioned above.

When the vehicle has traveled the section more than once, the control circuit 29 detects the amount of power charged in the vehicle for the number of travels. The control circuit 29 divides the detected charge amounts into groups based on charge amount magnitudes. For each of the groups, the control circuit 29 records the following in association with each other: a representative charge amount of charge amounts belonging to the group; and time attributes corresponding to occurrences of charging with the charge amount belonging to the group and an occupant count corresponding to the time attributes.

The navigation system 20 combines charge amounts from multiple travels on a given section into a representative charge amount. Charge amounts for the same section can be recorded in association with each other.

Each group is provided with the representative charge amount according to magnitudes of the detected charge amounts. The representative charge amount is associated with the traveling time attribute and the occupant count for the group. The recording can be used to estimate the charge amount corresponding to a future time attribute or an occupant count associated with a future time attribute for the section traveled by the vehicle.

The charging schedule process of the control circuit 29 will be described. The control circuit 29 performs the route specification process 29a to specify an optimum route to the destination and then performs the charging schedule process. FIG. 8 shows a flowchart of a program 200 executed on the control circuit 29 for the charging schedule process.

With reference now to FIG. 8, at 210 of the program 200, the control circuit 29 specifies the current time attribute such as, month, day, and hour period, and the current occupant count for the vehicle. The occupant sensor 26 is used to specify the current occupant count.

At 215, the control circuit 29 specifies a power consumption matching a search condition for all sections along the optimum route to the destination. The search condition is equivalent to the time attribute and the occupant count specified at 210. Specifically, the above-mentioned travel history recording process records the power consumption table for each set of the section and the occupant count. The control circuit 29 reads a record matching the search condition from each sub-table of the power consumption table for each section. The control circuit 29 specifies a record matching the search condition as follows: the control circuit 29 extracts a table matching the occupant count as the search condition; the control circuit 29 specifies a record matching the search condition from each sub-table of the extracted table; the matching record is identified by its month, day, and hour period that differs from that of the search condition within a specified time two hours; when there is not a record whose month, day, and hour period differs from that of the search condition within a specified time, the control circuit 29 searches for a record having the same month as that of the search condition and specifies the record as one matching the search condition; when there is not a record whose month equals that of the search condition, the control circuit 29 searches for a record having the highest travel count and specifies the record as one matching the search condition.

The above described procedures are performed on each of the sub-tables independently. When one sub-table contains multiple records matching the search condition, the control circuit 29 assumes the most recently updated record to be one matching the search condition.

Supposing a record is extracted that matches the search condition from the sub-table of the basic power consumption, for example as shown in FIG. 7. When the time attribute of the search condition is 11:15 on April 10, the bottom record will be identified as matching the search condition. When the time attribute of the search condition is 1:15 on April 15, the third record from the top will be identified as matching the search condition. When the time attribute of the search condition is 11:15 on May 10, the third record from the top will be identified as matching the search condition because the record has the largest travel count.

At 220 of FIG. 8, the control circuit 29 specifies the charge amount matching the search condition specified at 210 for each of all the sections along the optimum route to the destination. Specifically, the above-mentioned travel history recording process records the charge amount table for each set of the section and the occupant count. The control circuit 29 reads a record matching the search condition from each sub-table of the charge amount table for each section. The control circuit 29 follows the same procedure as that at Step 215 to specify a record matching the search condition.

At 230, the control circuit 29 calculates the total power consumption needed for the travel to the destination. Specifically, the control circuit 29 accumulates the power consumption value in the record matching the specified search condition for all the basic, driving-based, and operation-based power consumption events and all the sections. The accumulated value is assumed to be the total power consumption needed for the travel to the destination.

At 240, the control circuit 29 creates a charging schedule. Specifically, the control circuit 29 accumulates various charge amounts matching the current search condition for sections extending to the destination until the accumulated value reaches the total power consumption specified at 230 to the destination. Charge amounts can be accumulated in the order of the regenerative charge amount generated by the motor 3, the charge amount due to high-efficiency charging generated by the alternator 2, the charge amount due to medium-efficiency charging by the alternator 2, and the charge amount due to low-efficiency charging by the alternator 2 according to a preference.

Specifically, the control circuit 29 accumulates the value of the record for the regenerative charge amount specified at 220 for all the sections. The control circuit 29 stops accumulating the charge amounts when the resulting charge amount reaches the total power consumption associated with proceeding to the destination.

When the resulting charge amount of regenerative charge falls short of the total power consumption associated with proceeding to the destination, the control circuit 29 then accumulates the values of the high-efficiency charging records specified at 220 for sections one by one. When the accumulated charge amount reaches the total power consumption associated with proceeding to the destination, the control circuit 29 records the sections used for the accumulation as those for performing the high-efficiency charging and stops accumulating the charge amounts. The control circuit 29 does not specify a high-efficiency charging record at 220 for a section where the high-efficiency charging is not performed at all.

Even when the control circuit 29 has accumulated the charge amounts for all the sections associated with the regenerative charging and high-efficiency charging records, the resulting charge amount may nonetheless fall short of the total power consumption associated with proceeding to the destination. In such case, the control circuit 29 continues to accumulate the values of the medium-efficiency charging records specified at 220 for sections one by one. When the accumulated charge amount reaches the total power consumption associated with proceeding to the destination, the control circuit 29 records the sections used for the accumulation as those for performing the medium-efficiency charging and stops accumulating the charge amounts.

Even when the control circuit 29 has accumulated the charge amounts for all the sections associated with regenerative charging, the high-efficiency charging and the medium-efficiency charging records, the resulting charge amount may fall short of the total power consumption associated with proceeding to the destination. In such case, the control circuit 29 further accumulates the value of the low-efficiency charging record specified at 220 for sections one by one. When the accumulated charge amount reaches the total power consumption associated with proceeding to the destination, the control circuit 29 records the sections used for the accumulation as those for performing the low-efficiency charging and stops accumulating the charge amounts.

Figures 9, 10, 11:
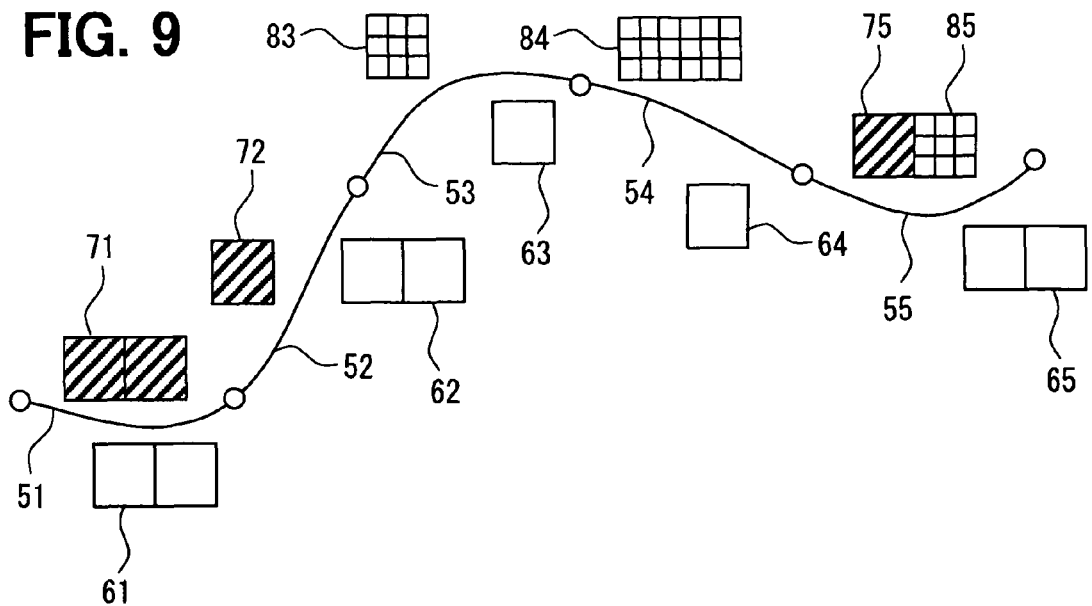
FIG. 9 is a diagram illustrating exemplary records of power consumption events, charge amounts generated by an alternator, and regenerative charge amounts generated by a motor corresponding to sections along a route to a destination.
FIG. 10 is a diagram illustrating another exemplary format for recording the basic power consumption.
FIG. 11 is a diagram illustrating still another exemplary format for recording the basic power consumption.

As shown in FIG. 9, the control circuit 29 determines estimated power consumption events 61 through 65 corresponding to the sections 51 through 55 associated with proceeding to the destination. In addition, the control circuit 29 determines the following charge amounts to compensate for the power consumption events: estimated regenerative charge amounts 71, 72, and 75 between the sections 51 and 55; the sections for performing the high-efficiency charging or an estimated charge amount 83 for the section; the sections for performing the medium-efficiency charging or an estimated charge amount 84 for the section; and the sections for performing the low-efficiency charging or an estimated charge amount 85 for the section. The control circuit 29 notifies the controller 10 of the sections for performing the determined high-efficiency, medium-efficiency, and low-efficiency charging. The controller then allows the alternator 2 to perform the charging for these sections.

The charging based on the charging schedule continues until the control circuit 29 determines at 250 that the charging schedule needs to be reviewed or until the control circuit 29 determines at 260 that the vehicle has reached the destination. The charging schedule needs to be reviewed when the charging schedule at 240 differs from an actual charge amount, within a specified tolerance, or when the actual traveling route of the vehicle deviates from the guided route or the optimum route.

When the charging schedule needs to be reviewed, the control circuit 29 determines a new charging schedule by repeating 210 through 240. The program 200 can then terminate when the vehicle reaches the destination or can start, resume or continue operation for a new destination.

While the control circuit 29 executes the program 200, the navigation system 20 performs the following process for each of the sections contained in the scheduled traveling route. When a recording function records representative power consumption events for groups of records having the same value in a given section, the navigation system 20 retrieves a representative power consumption with an associated time attribute or occupant count that matches the current time attribute or occupant count. The navigation system 20 specifies the representative power consumption as an estimated power consumption for the section at 215. The navigation system 20 specifies the sum of estimated power consumption events for specified sections as the estimated power consumption for the scheduled traveling route at 230.

The navigation system 20 further performs the following process for each of the sections. When the recording function records representative charge amounts for the groups, the navigation system 20 retrieves a representative charge amount whose associated time attribute or occupant count matches the current time attribute or occupant count. The navigation system 20 specifies the representative charge amount as an estimated charge amount for the section at 220.

Based on the estimated charge amount for each of the specified sections, the navigation system 20 determines sections to be enabled and those to be disabled from charging by the alternator 2. The purpose is to be able to charge the power equivalent to the estimated total power consumption through the scheduled traveling route. That is, the navigation system 20 determines the charging schedule (see Step 240).

In such a manner, the navigation system 20 can accurately estimate the power consumption for the scheduled traveling route using the representative power consumption events and charge amounts recorded for sections. Further, the navigation system can provide the charging schedule for determining which section is to be enabled or disabled from charging.

It should be noted that in the above-described embodiment, the navigation system 20 is similar to an example of the power consumption recording apparatus. For example, when the control circuit 29 of the navigation system 20 executes the program 100, the functions associated with the procedure described at 110 form an example of a first detection means; the functions associated with the procedure described at 120 form an example of a second detection means; and the functions associated with the procedure described at 130 form an example of a recording means. The control circuit 29 executing the program for the route specification process 29a forms an example of a route specification means.

When the control circuit 29 executes the program 200, the functions associated with the procedure described at 215 forms an example of a section power consumption estimation means; the functions associated with the procedure described at 230 form an example of a total power consumption estimation means; the functions associated with the procedure described at 220 form an example of a section charge amount estimation means; and the functions associated with the procedure described at 240 form an example of a charge amount means.

OTHER EMBODIMENTS

While various exemplary embodiments have been described herein, it is to be distinctly understood that the present invention is not limited thereto but may be otherwise variously embodied to provide the functions specified in accordance with the invention.

For example, the navigation system 20 may use the communication unit 24 to transmit the tables of recorded power consumption events and charge amounts along with the driver's identification information to an information management server outside the vehicle. In such a case, the navigation system 20 may acquire the driver's identification information through the driver's direct input operation using the operation switch group 23 or otherwise. The information management server records the received table and the driver's identification information. The information management server receives a signal requesting the table along with the driver's identification information from the navigation system 20 at which time the information management server transmits the table recorded with the identification information to the navigation system 20. The navigation system 20 can acquire information about the vehicle's power consumption and charge amount by transmitting a request for the driver ID and the table to the information management server according to need.

Further, the table for recording power consumption events is not limited to those shown in FIG. 6 and FIG. 7. As shown in FIG. 10, for example, each record may contain a season field. In such a case, the control circuit 29 specifies a record matching the search condition at 210 of the program 200 as follows: the control circuit 29 extracts a table matching the occupant count as the search condition; the control circuit 29 specifies a record matching the search condition from each sub-table of the extracted table; the matching record is identified by its month, day, and hour period that differs from that of the search condition within a specified time; when there is not a record whose month, day, and hour period differs from that of the search condition within a specified time, the control circuit 29 searches for a record having the same month as that of the search condition and specifies the record as one matching the search condition; when there is not a record whose month equals that of the search condition, the control circuit 29 searches for a record having the same season as that of the search condition and specifies the record as one matching the search condition; when there is not a record whose season equals that of the search condition, the control circuit 29 searches for a record having the highest travel count and specifies the record as one matching the search condition, and so on.

As shown in FIG. 11, the table for recording power consumption events should be configured to be capable of containing sufficient records for a period equivalent to 24 hours multiplied by 365 days for each of power consumption values in one sub-table. Each record may contain information such as a month, a day, a power consumption per hour period, for example, based on a one-hour interval, a season, and a travel count.

The navigation system 20 may further be configured to store a record about physical quantities such as a vehicle speed, and the number of accelerations and decelerations in a manner similar to the manner of storing the charge amount and the power consumption in each table associated with the combination of occupant count and section. The record can contain discrete values of the physical quantities, a travel count for the section, a traveling date for the section, and a traveling hour period. When the table satisfies the condition of lacking an unused record in a specified number of predetermined records, existing records are unified into one based on similar time attributes. In such a case, the sub-table is not generated by dividing the physical quantities into categories such as the sub-tables for the basic, driving-based, and operation-based power consumption events as mentioned above. The record about physical quantities such as the vehicle speed, and the number of accelerations and decelerations may be used to estimate the power consumption and the charge amount for a targeted section.

It should be noted that one section does not necessarily correspond to one link. For example, one link may be divided into sub-links according to geographical changes such as slopes and the number of lanes. In such an example, a section may correspond to a sub-link or, alternatively, to a number of consecutive links.

It should be noted that the power consumption recording apparatus according to the invention may be applied to not only a hybrid vehicle but also a vehicle using only an internal combustion engine as a power source or an electric vehicle using only a battery as a power source.

The alternator 2 may collectively record one charge amount without classifying it into the high-efficiency, medium-efficiency, and low-efficiency charging.

It should be noted that the above described embodiments are illustrative in nature and other embodiments are possible within the context of the invention. For example, while the control circuit 29 is described herein as executing a program to implement functions according to the embodiments, the functions may also be implemented using hardware having the capability to support the functions such as a microcomputer, a field programmable gate array (FPGA), or the like, that can be programmed and/or configured with a particular circuit construction for carrying out the functions.

What is claimed is:

1. A power consumption recording apparatus mounted on a vehicle, comprising:
   a first detection means for sequentially detecting a plurality of power consumption events by the vehicle corresponding to a plurality of travels as a result of traveling a section by the vehicle more than once;
   a second detection means for sequentially detecting at least one of a plurality of time attributes corresponding to the plurality of travels on the section by the vehicle and a plurality of occupant counts corresponding to the plurality of travels for the time attributes; and
   a recording means for classifying the plurality of power consumption events detected by the first detection means into a plurality of groups based on power consumption magnitudes and recording a representative power consumption representative of the plurality of power consumption events belonging to each of the plurality of groups and a time attribute or an occupant count corresponding to occurrence of a power consumption belonging to a given group in association with each other.

2. The power consumption recording apparatus of claim 1, wherein the second detection means detects a plurality of time attributes for the plurality of travels on the section by the vehicle; and
   wherein the recording means records the following in association with each other for each of the plurality of groups:
   a representative power consumption for a given group;
   a plurality of time attributes corresponding to occurrence of a plurality of power consumption events belonging to a given group; and
   the number of detections made by the first detection means for a power consumption belonging to a given group corresponding to each of the plurality of time attributes.

3. The power consumption recording apparatus of claim 1, wherein the second detection means detects a plurality of time attributes for the plurality of travels on the section by the vehicle; and
   wherein the recording means collectively records part or all of a plurality of time attributes recorded for at least one of the plurality of groups into one time attribute based on satisfaction of a criterion condition.

4. The power consumption recording apparatus of claim 1, wherein the first detection means detects a plurality of charge amounts generated by the vehicle corresponding to a plurality of travels as a result of traveling a section by the vehicle more than once; and
   wherein the recording means classifies the plurality of charge amounts detected by the first detection means into a plurality of groups based on charge amount magnitudes and records a representative charge amount representative of the plurality of charge amounts belonging to each of the plurality of groups and a plurality of time attributes for generating a charge amount belonging to a given group or an occupant count corresponding to the time attributes in association with each other.

5. The power consumption recording apparatus of claim 1, wherein the vehicle travels a plurality of sections more than once;
   wherein the first detection means detects as many consumptions used by the vehicle as the number of travels as a result of traveling each of the sections by the vehicle;
   wherein the second detection means detects at least one of a plurality of time attributes corresponding to the plurality of travels by the vehicle and a plurality of occupant counts corresponding to the plurality of travels for the time attributes; and
   wherein the recording means classifies the plurality of power consumption events detected by the first detection means in each of the sections into a plurality of groups based on power consumption magnitudes and records a representative power consumption representative of the plurality of power consumption events belonging to each of the plurality of groups and a plurality of quantities detected by the second detection means on a plurality of opportunities for allowing the first detection means to detect a power consumption belonging to the group in association with each other.

6. The power consumption recording apparatus of claim 5, comprising:
   a route specification means for specifying a scheduled traveling route for the vehicle;

a section power consumption estimation means for specifying one of the plurality of representative power consumption events for the plurality of groups recorded by the recording means in each of a plurality of sections included in a scheduled traveling route specified by the route specification means, the representative power consumption having the associated time attribute or occupant count matching a current time attribute or occupant count, as an estimated power consumption;

a total power consumption estimation means for specifying a total of estimated power consumption events for each of the plurality of sections estimated by the power consumption estimation means as an estimated power consumption for the scheduled traveling route.

7. The power consumption recording apparatus of claim 1, wherein the vehicle travels a plurality of sections more than once;

wherein the first detection means detects as many consumptions used by the vehicle as the number of travels as a result of traveling each of the sections by the vehicle;

wherein the first detection means further detects a plurality of charge amounts generated by the vehicle corresponding to a plurality of travels as a result of traveling each of the sections by the vehicle;

wherein the second detection means detects at least one of a plurality of time attributes corresponding to the plurality of travels by the vehicle and a plurality of occupant counts corresponding to the plurality of travels for the time attributes;

wherein the recording means classifies the plurality of power consumption events detected by the first detection means for each of the sections into a plurality of groups based on charge amount magnitudes and records a representative power consumption representative of the plurality of power consumption events belonging to each of the plurality of groups and a time attribute or an occupant count corresponding to occurrence of a power consumption belonging to a given group in association with each other; and wherein the recording means further classifies the plurality of charge amounts detected by the first detection means for each of the sections into a plurality of groups based on charge amount magnitudes and records a representative charge amount representative of the plurality of charge amounts belonging to each of the plurality of groups and a plurality of quantities detected by the second detection means on a plurality of opportunities for allowing the first detection means to detect a charge amount belonging to the group in association with each other.

8. The power consumption recording apparatus of claim 7, comprising:

a route specification means for specifying a scheduled traveling route for the vehicle;

a section power consumption estimation means for specifying one of the plurality of representative power consumption events for the plurality of groups recorded by the recording means in each of a plurality of sections included in a scheduled traveling route specified by the route specification means, the representative power consumption having the associated time attribute or occupant count matching a current time attribute or occupant count, as an estimated power consumption in the section; and a total power consumption estimation means for specifying a total of estimated power consumption events for each of the plurality of sections specified by the section power consumption estimation means as a total estimated power consumption for the scheduled traveling route;

a section charge amount estimation means for specifying one of the plurality of representative charge amounts for the plurality of groups recorded by the recording means in each of the plurality of sections, the representative power consumption having the associated time attribute or occupant count matching a current time attribute or occupant count, as an estimated charge amount in the section; and a charging schedule means for determining the plurality of sections for enabling and disabling charging based on an estimated charge amount for each of the plurality of sections specified by the section charge amount estimation means so as to be capable of charging a power as much as the estimated total power consumption specified by the total power consumption estimation means on the scheduled traveling route.

9. An article of manufacture comprising a computer readable medium and instructions carried on the medium, the instructions readable by a computer in a power consumption recording apparatus mounted on a vehicle, the instructions for causing the computer to:

sequentially detect a plurality of power consumption events by the vehicle corresponding to a plurality of travels as a result of traveling a section by the vehicle more than once;

sequentially detect at least one of a plurality of time attributes corresponding to the plurality of travels on the section by the vehicle and a plurality of occupant counts corresponding to the plurality of travels for the time attributes; and classifying the plurality of power consumption events detected by the first detection means into a plurality of groups based on power consumption magnitudes and recording a representative power consumption representative of the plurality of power consumption events belonging to each of the plurality of groups and a time attribute or an occupant count corresponding to occurrence of a power consumption belonging to a given group in association with each other.

10. An apparatus for recording power consumption of a vehicle, the apparatus comprising:

a first detector sequentially detecting a plurality of power consumption events corresponding to a plurality of travels over a route section;

a second detector sequentially detecting one of a plurality of time attributes corresponding to the plurality of travels and a plurality of occupant counts for the plurality of travels; and a classification unit for classifying the plurality of power consumption events detected by the first detector into groups based on power consumption magnitudes and identifying for each of the groups a representative power consumption representative of ones of the plurality of power consumption events in each of the groups and one of a time attribute and an occupant count corresponding to occurrence of a power consumption belonging to a given group in association with each other.

11. The apparatus of claim 10, wherein the second detector detects a plurality of time attributes for the plurality of travels; and wherein the classification unit records the following in association with each other for each of the plurality of groups:

the representative power consumption for a given one of the plurality of groups;

a plurality of time attributes corresponding to times of occurrence of the plurality of power consumption events; and a number of detections made by the first detector for a power consumption belonging to a given group corresponding to each of the plurality of time attributes.

12. The apparatus of claim 10, wherein:

the second detector detects a plurality of time attributes for the plurality of travels on the route section by the vehicle; and the classification unit combines and records at least a portion of the plurality of time attributes into one time attribute based on satisfying a condition.

13. The apparatus of claim 10, wherein:

the first detector detects a plurality of charge amounts generated by the vehicle corresponding to the plurality of travels; and the classification unit classifies the plurality of charge amounts detected by the first detection means into a plurality of groups based on charge amount magnitudes and records a representative charge amount representative of the plurality of charge amounts belonging to each of the plurality of groups and a plurality of time attributes for generating a charge amount belonging to a given group or an occupant count corresponding to the time attributes in association with each other.

14. The apparatus of claim 10, wherein the first detector detects as many consumptions used by the vehicle as the number of travels as a result of traveling each of the route sections by the vehicle;

the second detector detects the one of the plurality of time attributes and a plurality of occupant counts corresponding to the plurality of travels for the time attributes; and the classification unit classifies the plurality of power consumption events detected by the first detector in each of the sections into a plurality of groups based on power consumption magnitudes and records a representative power consumption representative of the plurality of power consumption events belonging to each of the plurality of groups and a plurality of quantities detected by the second detector on a plurality of opportunities for allowing the first detector to detect a power consumption belonging to the group in association with each other.

15. The apparatus of claim 10, comprising:

a route specification unit specifying a scheduled traveling route for the vehicle;

a power consumption estimator for specifying one of the plurality of representative power consumption events in each of a plurality of sections included in a scheduled traveling route as an estimated power consumption, the specified one of the plurality of representative power consumption events having one of the associated time attribute and occupant count matching a current corresponding one of the time attribute and the occupant count;

a total power consumption estimator for specifying a total of estimated power consumption events for each of the plurality of sections estimated by the power consumption estimation means as an estimated power consumption for the scheduled traveling route.

16. The apparatus of claim 15, comprising:

a route specification unit for specifying a scheduled traveling route for the vehicle the scheduled traveling route including one of the plurality of sections;

a section power consumption estimator for specifying one of the plurality of representative power consumption events as an estimated power consumption in the section, the representative power consumption events having the associated time attribute or occupant count matching a current time attribute or occupant count; and a total power consumption estimation means for specifying a total of estimated power consumption events for each of the plurality of sections specified by the section power consumption estimation means as a total estimated power consumption for the scheduled traveling route;

a section charge amount estimator for specifying one of the plurality of representative charge amounts as an estimated charge amount in the one of the plurality of sections, the representative power consumption having one of the associated time attribute and the occupant count matching a corresponding one of a present time attribute and a present occupant count; and a charging scheduler for enabling and disabling charging during travel over the one of the plurality of sections based on an estimated charge amount for each of the plurality of sections specified by the section charge amount estimation means so as to be capable of charging a power as much as the estimated total power consumption specified by the total power consumption estimation means on the scheduled traveling route.

* * * * *